(12) United States Patent
Miyauchi

(10) Patent No.: US 6,447,282 B1
(45) Date of Patent: Sep. 10, 2002

(54) APPARATUS FOR SWIVELING INJECTION UNIT OF ELECTRIC MOTOR-DRIVEN INJECTION MOLDING MACHINE

(75) Inventor: Takaki Miyauchi, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,653

(22) Filed: Jul. 28, 2000

(30) Foreign Application Priority Data

Jul. 28, 1999 (JP) .......................................... 11-213783

(51) Int. Cl.⁷ .............................................. B29C 45/24
(52) U.S. Cl. ........................................ 425/226; 425/574
(58) Field of Search ................................ 425/225, 226, 425/562, 589, 574, 576

(56) References Cited

U.S. PATENT DOCUMENTS

| | | | | |
|---|---|---|---|---|
| 5,505,606 A | * | 4/1996 | Ito et al. ........................ | 425/225 |
| 5,670,186 A | * | 9/1997 | Nishimura et al. ............. | 425/574 |
| 6,273,708 B1 | * | 8/2001 | Koide et al. ................... | 425/589 |

\* cited by examiner

*Primary Examiner*—Tim Heitbrink
(74) *Attorney, Agent, or Firm*—Pillsbury Winthrop LLP

(57) ABSTRACT

There is provided an apparatus capable of smoothly swiveling an injection unit of medium or large motor-driven injection molding machine. The apparatus comprises: a slide base 17 which is provided on a frame 15 so as to be linearly movable; injection unit bases 18a and 18b which are stacked on the slide base 17 so as to be relatively movable and on which an injection unit 10 is mounted; a nozzle touch mechanism having ball screw feed mechanisms 22 and 23 for converting the rotation of a motor 21 into thrust for the slide base 17; a pivot 24 for pivotably connecting the injection unit bases 18a and 18b to the slide base 17; a pivot pin 25 for restricting the forward movement of the injection unit base 18a to switch the state of the injection unit base 18a to a pivotable state; a pin connecting portion 26, which is provided at a position, at which the pin connecting portion integrated with the injection unit base 18a is deviated from the pivot 24, for connecting the injection unit base to the pivot pin 25 so that the forward movement of the injection unit base 18a is restricted by the pivot pin 25 to be converted into a swiveling motion; a pin supporting portion 28, secured to the frame 15, for supporting the pivot pin 25 so that the pivot pin 25 is slidable in axial directions; and a pin operating portion 30 for causing the pivot pin 25 to be inserted into and extracted from the pin connecting portion 26.

6 Claims, 4 Drawing Sheets

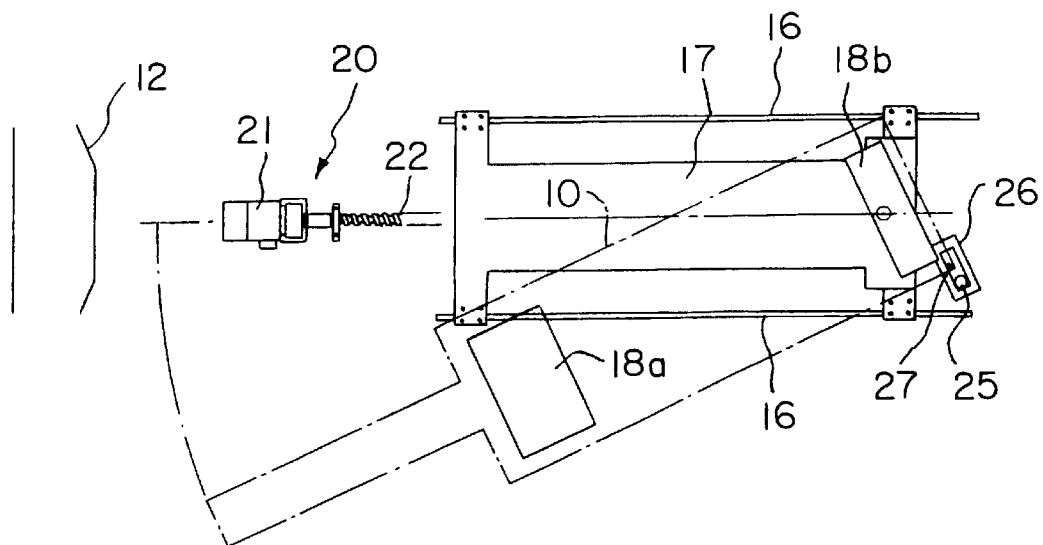
F I G. 7
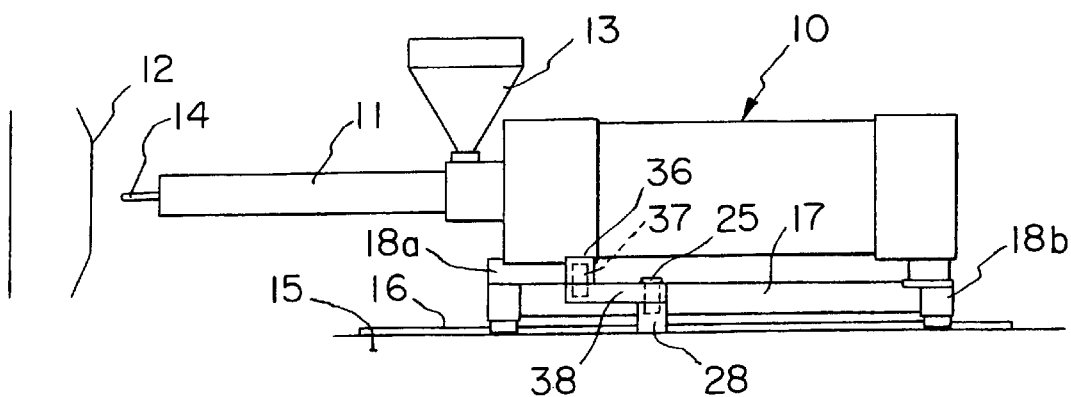
F I G. 8
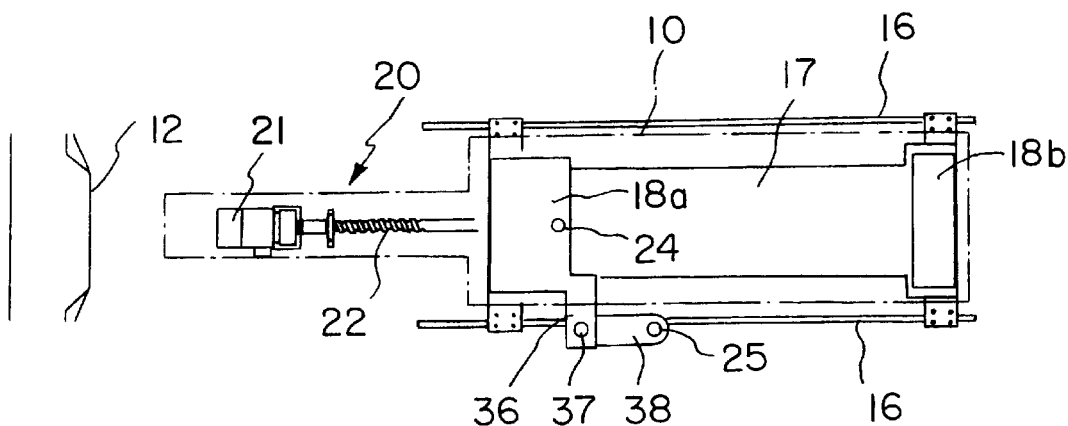
F I G. 9

APPARATUS FOR SWIVELING INJECTION UNIT OF ELECTRIC MOTOR-DRIVEN INJECTION MOLDING MACHINE

BACKGROUND OF THE INVENTION

1. Field of the Invention

The present invention relates generally to an apparatus for swiveling an injection unit of a motor-driven injection molding machine. More specifically, the invention relates to an apparatus for smoothly and automatically swiveling an injection unit by utilizing the drive power of a nozzle touch mechanism for producing a turn on a pivot pin.

2. Description of the Prior Art

In an injection unit of an injection molding machine, it is required to detach a screw from a heating cylinder for maintenance of the screw, the heating cylinder and so forth. In order to facilitate the maintenance work, it is required to swivel the injection unit to prevent it from interferes with a fixed die plate, after moving the injection unit backward from a nozzle touch position.

Since the injection unit is too heavy to be manually handled, a dedicated device for swiveling the injection unit is provided to accomplish the automatic swiveling motion. In conventional hydraulic injection molding machines, a swiveling device and a nozzle touch mechanism use the same hydraulic cylinder both for carrying out the nozzle touch motion and the swiveling motion.

In recent years, with the advantages of easy control and energy saving effect, motor-driven injection molding machines come into wide use in place of hydraulic injection molding machines. For motor-driven injection molding machines, various swiveling devices have been known. A typical swiveling device for a motor-driven injection molding machine is disclosed in Japanese Patent Publication No. 1992-27933. As shown in FIG. 11, an injection unit base 5, in which an injection unit is installed, is pivotable with respect to an extruder base 6 by means of a pivot pin 7. The extruder base 6 has a elongated hole 16. The elongated hole 16 extends from the center line, at which the pivot pin 7 is provided, to a side, and extends so as to go away from a front edge 6a. A drive pin 8 passes through the elongated hole 16 to be fixed to a ball nut 10. This ball nut 10 engages with a ball screw 11 included in a nozzle touch mechanism. This swiveling device can utilize the nozzle touch mechanism to accomplish a swiveling function while moving the extruder base 6 and the injection unit base 5 backward.

In the past, most of motor-driven injection molding machines had been belonged to small class of machines. In recent years, motor-driven injection molding machines in medium or large class have been developed and widely spread. In such a motor-driven injection molding machine in medium or large class, the injection unit is so heavy that the load applied on the ball screw and ball nut of the nozzle touch mechanism unavoidablly increases.

In addition, as shown in FIG. 11, when the nozzle touch mechanism is utilized for swiveling the injection unit while backward movement, a bending load synthesized by a radial load and a moment load is applied on the ball screw 11 of the nozzle touch mechanism, so that the uniformity of the load applied on the ball screw 11 is damaged to remarkably reduce its service life. For that reason, the diameter of the ball screw is inevitably increased than a diameter of the ball screw that meets requirement for the nozzle touch force. Therefore, the space for installing the nozzle touch mechanism is increased in order to build the large-diameter ball screw 11 and the ball nut 10 therein.

SUMMARY OF THE INVENTION

It is therefore an object of the present invention to eliminate the aforementioned problems and to provide a swiveling device at a space saving capable of smoothly swiveling an injection unit of a electric motor-driven injection molding machine by using a function of the nozzle touch mechanism without applying an excessive bending load on a ball screw, even if the motor-driven injection molding machine belongs to a medium or large class of the machine.

In order to accomplish the aforementioned and other objects, according to one aspect o the present invention, there is provided an apparatus for swiveling an injection unit of a motor-driven injection molding machine, said apparatus comprising: a slide base provided on a frame so as to be linearly movable; an injection unit base for mounting an injection unit thereon, pivotably stacked on the slide base; a nozzle touch mechanism having a motor and a screw feed mechanism for converting the rotation of the motor into thrust force and transmitting the thrust force to the slide base to connect and disconnect a nozzle of the injection unit with a mold; a pivot member connection the slide base with the injection unit base for forming the center on which the slide base is turned around; and a swiveling means for converting forward movement of the injection unit base into swiveling movement by restraining the injection unit base from advancing so that the slide base driven by the screw feed mechanism is allowed to advance.

The swiveling means may comprises a pin connecting means arranged between the injection unit base and the frame at a position deviated from the pivot, the pin connecting means integrated with the injection unit base; a pivot connecting pin member capable of connecting and disconnecting with the pin connecting means; a pin supporting means, secured to the frame, for supporting said pivot connecting pin member so as to is connectable with the pin connecting means; and a pin operating means for causing the pivot connecting pin to engage with or disengage from the pin connecting member.

The pin connecting portion may comprise an arm portion, which protrudes from one side portion of the injection unit base, and a long groove which is formed in the arm portion and which receives the pivot pin therein.

Alternatively, the pin connecting portion may comprise an arm portion, which protrudes from one side portion of the injection unit base, and a link member, one end of which is connected to the arm portion via a pin, and the other end of which is connected to the pin supporting portion by the pivot pin.

The injection unit base may comprise a front base and a rear base, and the pivot pin is mounted on any one of the front base or the rear base.

According to the present invention, by inserting the pivot pin into the pin connecting portion, the forward movement of the injection unit base is restricted by the pivot pin, and the slide base continues to move forward. Therefore, if the injection unit base intends to move forward with the slide base, the pin connecting portion gradually swivels the injection unit base about the pivot. Since the slide base connected to the ball screw feed mechanism of the nozzle touch mechanism moves only forward and rearward, no excessive loads, such as a bending load, are not applied on the ball screw.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 7 is a plan view showing the swiveling operation of an injection unit in the second preferred embodiment;

FIG. 8 is a side view of the third preferred embodiment according to the present invention;

FIG. 9 is a plan view schematically showing the swiveling device in the third preferred embodiment;

DESCRIPTION OF THE PREFERRED EMBODIMENTS

Referring now to the accompanying drawings, the preferred embodiments of a swiveling device according to the present invention will be described below.

First Preferred Embodiment

Figure 1:
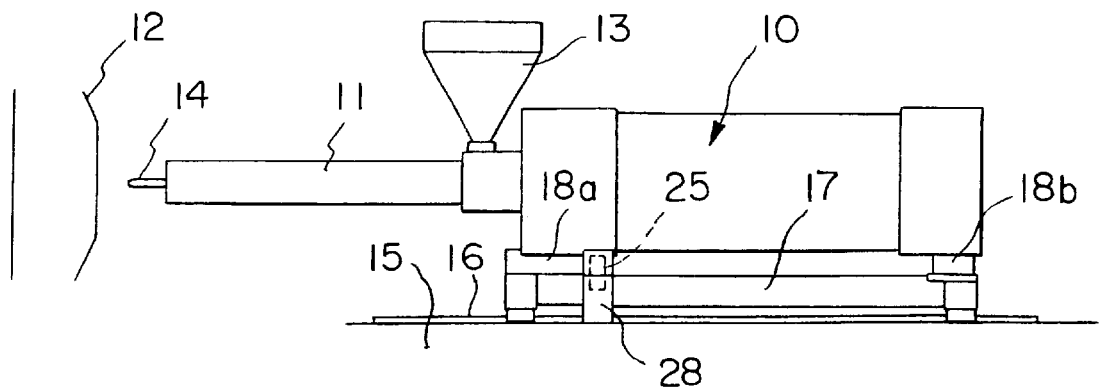
FIG. 1 is a side view of the first preferred embodiment according to the present invention.

FIG. 1 is a side view of the first preferred embodiment of a apparatus for a injection unit of a motor-driven injection molding machine according to the present invention. Reference number 10 denotes an injection unit. The injection molding machine includes a clamping unit provided with a fixed die on which a fixed mold is mounted. The injection unit 10 is provided with a heating barrel 11. A screw, not shown is installed co-axially in the heating barrel 11. The screw is driven by an electric motor, such as an electric servo motor, to carry out a series of functions including the plastication of the polymer material, which is supplied through a hopper 13 to the heating barrel 11, and the charging and injection of the melt material. The tip portion of the heating barrel 11 is provided with a nozzle 14. The whole injection unit advances toward the fixed die 12 by means of a nozzle touch mechanism, which will be described later, to cause the nozzle 14 to contact a inlet of the fixed die 12 so that the melt material is drawn into a cavity.

Reference number 15 denotes a frame of the injection molding machine. On the top of the frame 15, a guide 16 is extending to provides a guide rail for a slide base 17. The slide base 17 is guided by the guide 16 to be slidable only forward and backward in the axial direction of the screw.

An injection unit base comprising a front base 18a and a rear base 18b is mounted on the top of the slide base 17. The injection unit 10 is fixed to the injection unit base.

Figure 2:
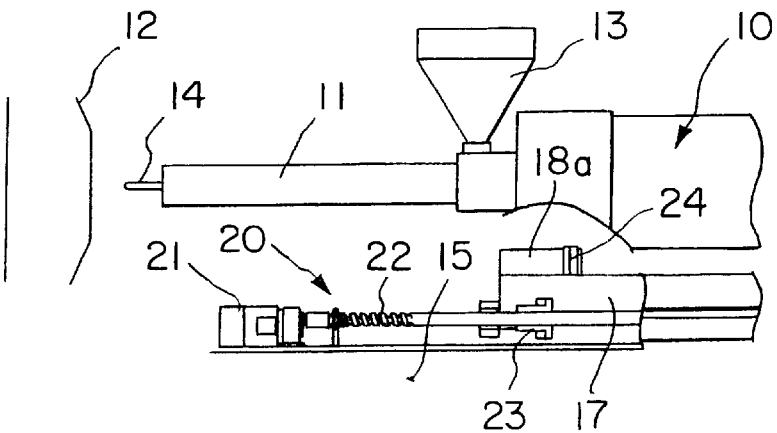
FIG. 2 is a view showing a nozzle touch mechanism of the motor-driven injection molding machine.

FIG. 2 shows a nozzle touch mechanism 20 for detachably connecting the nozzle 14 of the injection unit 10 with the inlet opened in the fixed die 12. The nozzle touch mechanism 20 is driven by a servo motor 21. The elastic servo motor 21 rotates a ball screw 22 extending in the axial direction of the screw. A ball nut 23 engaged with the ball screw 22 is secured to the slide base 17. Therefore, the rotation of the servo motor 21 is converted into a linear motion by the ball screw 22 and the ball nut 23 to be transmitted to the slide base 17 as thrust force. The injection unit 10, together with the slide base 17, moves forward and backward, while a nozzle touch operation, a control unit (not shown) carries out the precise position control of the servo motor 21 to touch the nozzle 14 to the fixed die 12.

Figure 4:
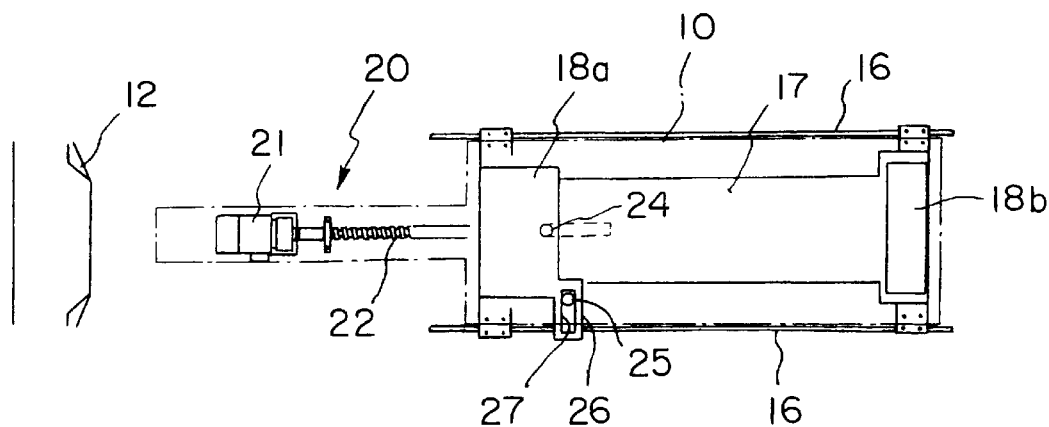
FIG. 4 is a plan view showing an injection unit at a swiveled position.

FIG. 4 shows the associated relationship between the front base 18a and the rear base 18b, which constitute the injection unit base. In order to allow the injection unit base to be swiveled on the slide base 17, the front base 18a is rotatably connected to the slide base 17 via a pivot 24. Reference number 25 denotes a pivot connecting pin for restricting the forward movement of the front base 18a of the injection unit base and for switching the state of the front base 18a to a pivotable state. The pivot connecting pin 25 is capable of engaging a long groove 27 formed in the arm portion of a pin connecting portion 26 which protrudes from the rear-left end portion of the front base 18a of the injection unit base.

Figure 3:
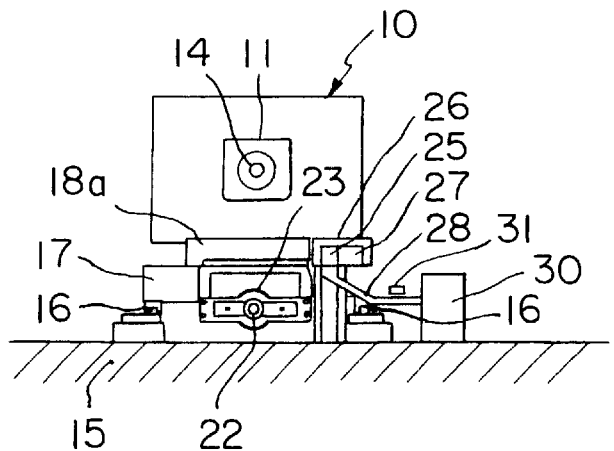
FIG. 3 is a front view of the swiveling device in the first preferred embodiment.

As shown in FIG. 3, the pivot connecting pin 25 is inserted into a cylindrical pin supporting member 28, the base end of which is secured to the frame 15, so as to be movable in axial directions, so that the pivot connecting pin 25 can be inserted into and extracted from the long groove 27 of the pin connecting portion 26 by means of a pivot-pin operating actuator 30. Furthermore, reference number 31 denotes a limit switch for detecting that the pivot pin 25 enters the long groove 27. The limit switch 31 is turned on at a position, at which the arm portion of the actuator 30 moves upwards so that the pivot connecting pin 25 enters the long groove 27.

The operation of the above described swiveling device in the first preferred embodiment will be described below.

The nozzle touch operation of the nozzle touch mechanism 20 is not particularly different from those of conventional nozzle touch mechanisms. However, the power of the nozzle touch mechanism 20 can be utilized for swiveling the injection unit 10 as follows.

First, the servo motor 21 of the nozzle touch mechanism 20 rotates to cause the slide base 17, together with the injection unit 10, to move forward and backward: The injection unit 10 advances to a predetermined nozzle swiveled position, at which the nozzle 14 does not interfere with the fixed die 12 even if the nozzle 14 is swiveled, as shown in FIG. 4. In FIG. 3, the pivot-pin operating actuator 30 operates to insert the pivot connecting pin 25 into the long groove 27 of the pin connecting portion 26. At this time, this can be confirmed since the limit switch 31 is turned on if the pivot pin 25 is surely inserted.

Figure 5:
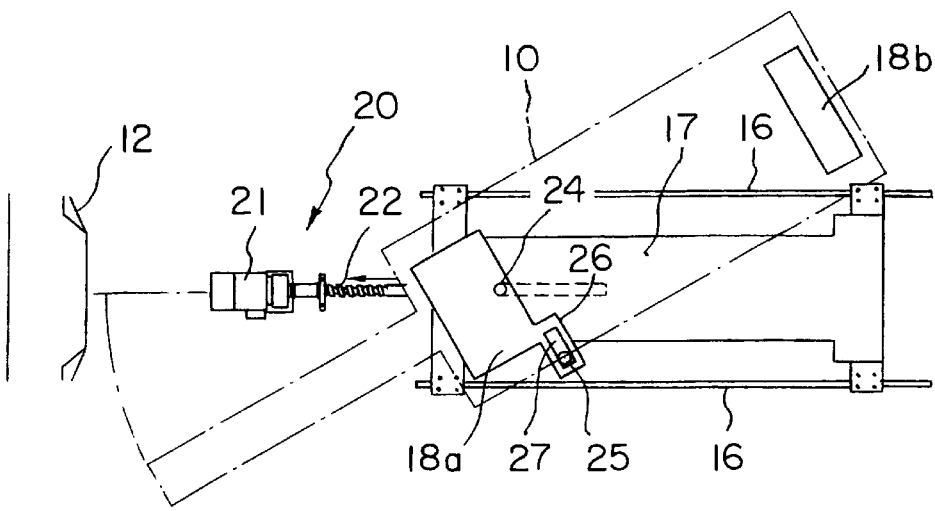
FIG. 5 is a plan view showing the swiveling operation of the injection unit.

Then, the servo motor 21 of the nozzle touch mechanism 20 rotates again to cause the slide base 17 together with the front base 18a and the rear base 18b to advance. Although the slide base 17 is guided by the guide 16 to continue to advance, the front base 18a is restrained from advancing by the pivot pin 25 which is located at a point deviated from the pivot 24. Even if the front base 18a keeps to advance, the front base 18a is gradually swiveled about the pivot 24 as shown in FIG. 5 as the pivot connecting pin 25 slides along the long groove 27 when the front base 18a keeps to advance. Therefore, the whole injection unit 10 provided on the front base 18a and the rear base 18b is turned round on the pivot 24 as shown in FIG. 5.

The control unit (not shown) stops the swiveling operation at a position, at which the servo motor 21 rotates by a predetermined rotations. Thereafter, it is possible to carry out the cleaning of the nozzle, the insertion and extraction of the screw, the exchange thereof and so forth.

Thus, the ball screw 22 and ball nut 23 of the nozzle touch mechanism 20 can be guided by the guide 16 to swivel only the front base 18a and rear base 18b, on which the injection unit 10 is mounted, so that it is possible to realize a smooth swiveling motion without applying the bending load on the ball screw 22. Therefore, even if the injection unit 10 belongs to a medium or large class, heavy injection unit, it is possible to carry out a smooth swiveling operation by utilizing the servo motor 21 of the nozzle touch mechanism 20 and the ball screw mechanism having a outer diameter fit for the nozzle touch force.

Furthermore, the injection unit 10 can be returned to the initial position by reversely rotating the servo motor 21. Then, when the injection unit 10 is backed to the nozzle swiveled position before swivel, the pivot-pin operating actuator 30 operates to extract the pivot connecting pin 25 from the long groove of the pin connecting portion 25.

Second Preferred Embodiment

Figure 6:
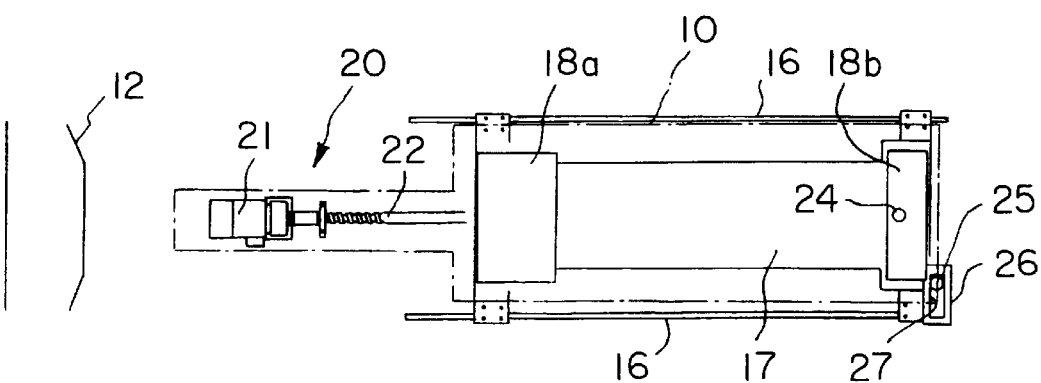
FIG. 6 is a plan view schematically showing the second preferred embodiment according to the present invention.

FIGS. 6 and 7 shows the second preferred embodiment of a swiveling device according to the present invention. The difference between this second preferred embodiment and the first preferred embodiment is that the positions of the pivot 24 and the pin connecting portion 26 are different from those in the first preferred embodiment. In the second preferred embodiment, the rear base 18b constituting the injection unit base is connected to the slide base 17 via the pivot 24, and the pin connecting portion 26 is also provided on the rear base 18b. Other constructions are the same as those in the first preferred embodiment. Even if the pivot 24 and the pin connecting portion 26 are thus provided on the rear base 18b, it is possible to obtain a smooth swiveling operation similar to the first preferred embodiment.

Third Preferred Embodiment

Figure 10:
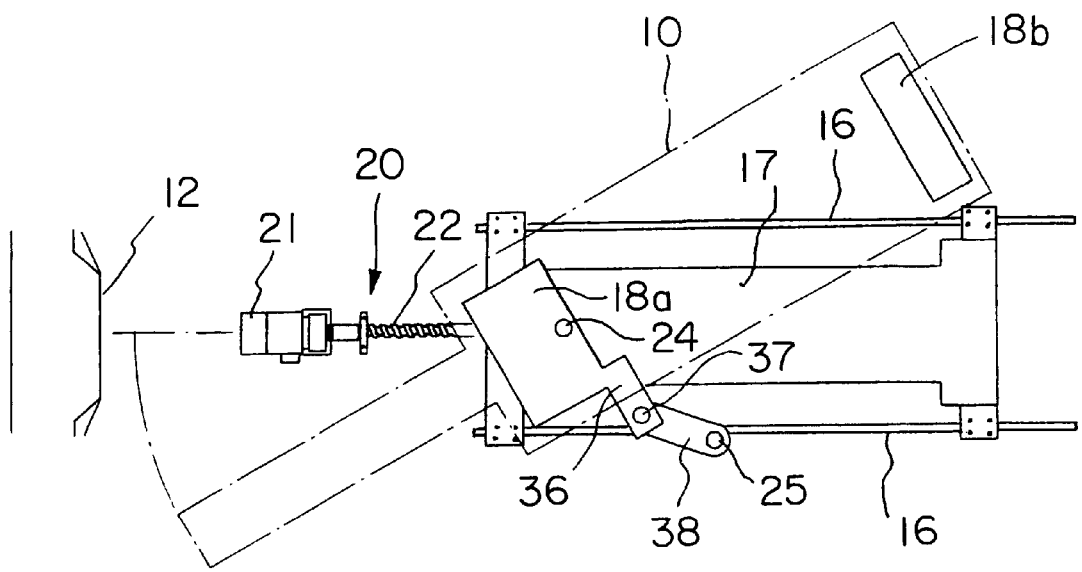
FIG. 10 is a plan view showing the swiveling operation of an injection unit using the swiveling device in the third preferred embodiment.
Figure 11:
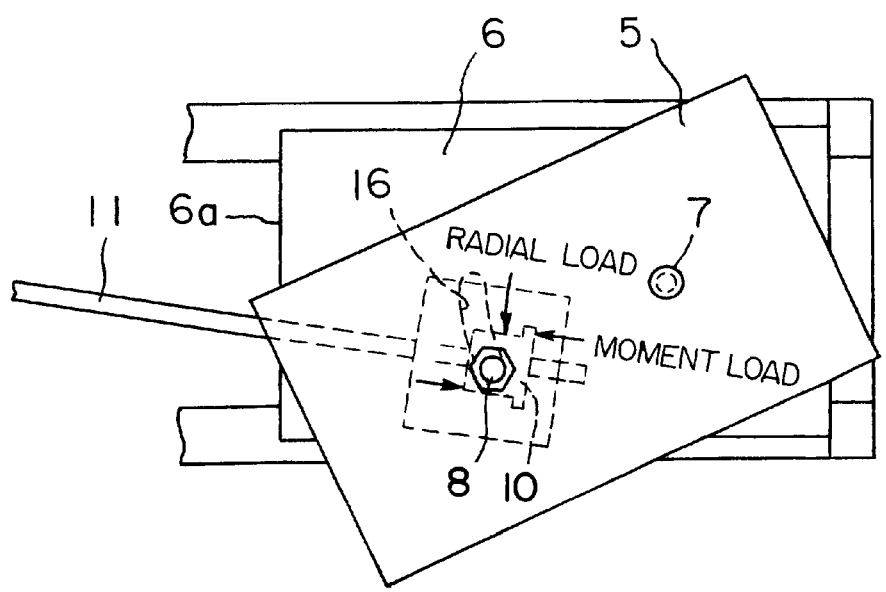
FIG. 11 is a plane view showing the swiveling operation of an injection unit using a conventional swiveling device.

Referring to FIGS. 8 through 10, the third preferred embodiment of the present invention will be described below.

FIG. 8 is a side view of the third preferred embodiment of a swiveling device according to the present invention. FIG. 9 is a plan view showing the slide base 17, and the front base 18a and the rear base 18b, which constitute the injection unit base. In this third preferred embodiment, the construction of a pin connecting portion is different from those in the above described preferred embodiments.

As shown in FIG. 9, an arm portion 36 protrudes to the left from the front base 18a, which is connected to the slide base 17 via the pivot 24. One end of a link member 38 is connected to the arm portion 36 via a pin 37. To the other end of the link member 38, the pivot connecting pin 25 is detachably connected. The pin operating mechanism 30 for inserting/extracting the pivot connecting pin 25 into/from the link member 38, and the pin supporting portion 28 for supporting the pivot connecting pin 25 on the frame 15 are the same as those shown in FIG. 3.

The swiveling operation of the above described swiveling device in the third preferred embodiment will be described below.

Although the slide base 17 is driven by the servo motor 21 to intend to advance with the front base 18a and rear base 18b of the injection unit provided thereon, the forward movement of the front base 18a is restrained from advancing since the front base 18a is connected to the frame 15 by means of the link member 38 and the pivot connecting pin 25. Although the slide base 17 continues to advance, the front base 18a is gradually swiveled about the pivot 24 in the direction shown in FIG. 1 as the link member 38 moves when the front base 18a intends to advance, since the front base 18a is restricted by the link member 38 and the pivot connecting pin 25 even if it intends to advance. Therefore, similar to the first and second preferred embodiments, the whole injection unit 10 provided on the front base 18a and rear base 18b is swiveled as shown in FIG. 10.

While the present invention has been described in terms of various preferred embodiments, the present invention should not be limited thereto. For example, the pivot pin and the pin connecting portion may be provided on the right side to swivel the injection unit 10 clockwise. In addition, if the link member in the third preferred embodiment is mounted on the rear base, the same swiveling operation can be realized. Moreover, if the pin connecting portion and the link member are provided on the frame and if the pivot pin, the pin supporting portion and the pin operating portion are provided on the injection unit base, the same swiveling operation can be realized.

As can be clearly seen from the foregoing, according to the present invention, it is possible to smoothly swivel a motor-driven injection molding machine by utilizing a space saving nozzle touch mechanism without applying an excessive bending load on a ball screw, even if the motor-driven injection molding machine is a medium or large machine.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for swiveling an injection unit of an electric motor-driven injection molding machine, said apparatus comprising:

a slide base provided on a frame so as to be linearly movable;

an injection unit base for mounting an injection unit thereon, pivotably stacked on the slide base;

a nozzle touch mechanism having an electric motor and a screw feed mechanism for converting the rotation of the electric motor into thrust force and transmitting the thrust force to the slide base to connect and disconnect a nozzle of the injection unit with a mold;

a pivot member connection the slide base with the injection unit base for forming the center on which the slide base is turned around; and a swiveling means for converting forward movement of the injection unit base into swiveling movement by restraining the injection unit base from advancing so that the slide base driven by the screw feed mechanism is allowed to advance.

2. The apparatus according to claim 1, wherein said swiveling means comprising:

a pin connecting means arranged between the injection unit base and the frame at a position deviated from the pivot, the pin connecting means integrated with the injection unit base;

a pivot connecting pin member capable of connecting and disconnecting with the pin connecting means;

a pin supporting means, secured to the frame, for supporting said pivot connecting pin member so as to is connectable with the pin connecting means; and a pin operating means for causing the pivot connecting pin to engage with or disengage from the pin connecting member.

3. The apparatus according to claim 1, wherein said pin connecting means comprises an arm portion, which protrudes from one side portion of the injection unit base, and a long groove formed in the arm portion so as to receive the pivot connecting pin member therein.

4. The apparatus according to claim 2, wherein said pin connecting means comprises an arm portion, which protrudes from one side portion of the injection unit base, and a link member, one end of which is connected to the arm portion via a pin, and the other end of which is connected to the pin supporting portion by the pivot connecting pin.

5. The apparatus according to claim 3 or 4, wherein said injection unit base comprises a front base and a rear base, and the pivot connecting pin is mounted on any one of the front base or the rear base.

6. The apparatus according to claim 3 or 4, wherein said pin operating means comprises a actuator for moving the pivot connecting pin in the axial direction so as to be inserted into or retracted from the long groove, limit switch means for detecting that the pivot connecting pin is inserted into the long groove.

* * * * *